(12) United States Patent
Tsuyuzaki et al.

(10) Patent No.: US 11,180,008 B2
(45) Date of Patent: Nov. 23, 2021

(54) VEHICLE BODY STRUCTURE OF AUTOMOBILE

(71) Applicant: Honda Motor Co., Ltd., Tokyo (JP)

(72) Inventors: Takumi Tsuyuzaki, Saitama (JP); Keiko Muro, Saitama (JP); Norihiko Nakamine, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 73 days.

(21) Appl. No.: 16/679,345

(22) Filed: Nov. 11, 2019

(65) Prior Publication Data

US 2020/0148044 A1 May 14, 2020

(30) Foreign Application Priority Data

Nov. 12, 2018 (JP) .............................. JP2018-211943

(51) Int. Cl.
| B60J 7/043 | (2006.01) |
| B60J 7/00  | (2006.01) |
| B60R 13/02 | (2006.01) |

(52) U.S. Cl.
CPC .............. B60J 7/043 (2013.01); B60J 7/003 (2013.01); B60R 13/0212 (2013.01)

(58) Field of Classification Search
CPC ......... B60J 7/0007; B60J 7/043; B60R 13/04; B60R 13/0212
USPC ......... 296/214, 1.08, 203.01, 203.03, 216.01
See application file for complete search history.

(56) References Cited

U.S. PATENT DOCUMENTS

| 5,352,011 A * | 10/1994 | Kihara ................... B62D 23/00 |
| | | 296/203.03 |
| 7,407,222 B2 * | 8/2008 | Anderson .............. B62D 25/06 |
| | | 296/193.05 |
| 10,144,455 B2 * | 12/2018 | Anegawa ............. B62D 27/023 |
| (Continued) | | |

FOREIGN PATENT DOCUMENTS

| EP | 2420432 A1 * | 2/2012 | ............. B62D 25/04 |
| JP | 2010052636 | 3/2010 | |
| (Continued) | | | |

OTHER PUBLICATIONS

Nakamura and Mitsubishi Motors Corp, "Roof Skeleton Structure of Vehicle", Mar. 1, 2012, J-Plat Pat publication (Year: 2012).*

(Continued)

*Primary Examiner* — Dennis H Pedder
*Assistant Examiner* — Joyce Eileen Hill
(74) *Attorney, Agent, or Firm* — JCIPRNET (57) ABSTRACT

A sun shade apparatus is provided. Each of a pair of right and left roof side rails is constituted of upper and lower members which are joined to each other. A dimension in an up-down direction can be reduced while a closed cross-sectional area required for the roof side rail is ensured to maintain a strength and a rigidity thereof, and a height of a vehicle cabin can be ensured by compactly disposing a sun shade apparatus under a lower surface of a roof panel while enhancing side collision resisting performance by restricting bending of the roof side rails in cooperation with a cross member when a collision load of a side collision is input. Due to roof side garnishes covering outer end portions of the roof panel and upper surfaces of the roof side rails, the rigidity and the strength of the roof side rails can be further enhanced.

17 Claims, 6 Drawing Sheets

(56) References Cited

U.S. PATENT DOCUMENTS

| | | | | |
|---|---|---|---|---|
| 2004/0189053 A1* | 9/2004 | Zummallen | ............ | B62D 25/04 |
| | | | | 296/202 |
| 2004/0212223 A1* | 10/2004 | Donovan | ............ | B60R 11/0229 |
| | | | | 296/216.01 |
| 2011/0204682 A1* | 8/2011 | Kamei | ................... | B60J 7/0015 |
| | | | | 296/216.04 |
| 2011/0226312 A1* | 9/2011 | Bohm | ...................... | B32B 7/12 |
| | | | | 136/251 |

FOREIGN PATENT DOCUMENTS

| | | | | |
|---|---|---|---|---|
| JP | 2012040999 | A | * | 3/2012 |
| JP | 5219075 | | | 6/2013 |
| JP | 2016097696 | A | * | 5/2016 |

OTHER PUBLICATIONS

Kodai and Suzuki Motor Corp, "Roof Side Reinforcement Structure of Curtain Airbag-Mounted Vehicle", May 30, 2016, Patentscope (Year: 2016).*

Office Action of Japan Counterpart Application, with English translation thereof, dated Jul. 8, 2020, pp. 1-8.

* cited by examiner

FIG. 6

VEHICLE BODY STRUCTURE OF AUTOMOBILE

CROSS-REFERENCE TO RELATED APPLICATION

This application claims the priority benefit of Japan application serial No. 2018-211943, filed on Nov. 12, 2018. The entirety of the above-mentioned patent application is hereby incorporated by reference herein and made a part of this specification.

BACKGROUND

Technical Field

The disclosure relates to a vehicle body structure of an automobile in which a pair of right and left roof side rails extending in a front-rear direction are connected to each other through a roof panel.

Description of Related Art

Regarding a structure in which a sun shade apparatus is disposed below a transparent panorama roof panel connecting a pair of right and left roof side rails to each other, a structure is known by Japanese Patent No. 5219075, in which each of the roof side rails is constituted of an outer panel, an inner panel, and a reinforcement which are joined to each other and form a closed cross section; an upper surface of the panorama roof panel supported by overlapping flange portions of the outer panels, the inner panels, and the reinforcements is connected to upper end portions of the outer panels; and a shade cover member of the sun shade apparatus is supported by the inner panels.

Incidentally, in roof side rails of structures in the related art, overlapping flange portions supporting a lower surface of the panorama roof panel are lower by one step than upper end portions of outer panels connected to an upper surface of the panorama roof panel with a step interposed therebetween. Therefore, in a case of ensuring a gap between the panorama roof panel and a shade cover member of a sun shade apparatus in an up-down direction, the height of the shade cover member of the sun shade apparatus becomes lower than the upper end portions of the outer panels of the roof side rails by as much as the foregoing step, thereby resulting in a problem of constraints on the height of a vehicle cabin in the up-down direction.

Dimensions of roof side rails in the up-down direction may be reduced in order to ensure the height of the vehicle cabin in the up-down direction. However, if only the dimensions of the roof side rails in the up-down direction are reduced, when a collision load of a side collision is input to a center pillar, there is a possibility that the rigidity and the strength of the roof side rails will deteriorate and the center pillar will fall inward in a vehicle width direction, so that side collision resisting performance may deteriorate.

The disclosure provides a vehicle body structure of an automobile, such that a sun shade apparatus is compactly disposed under a lower surface of a roof panel while side collision resisting performance is ensured.

SUMMARY

According to the embodiment, there is provided a vehicle body structure of an automobile in which a pair of right and left roof side rails extending in a front-rear direction are connected to each other through a roof panel. The roof side rail is constituted of an upper member and a lower member which are joined to each other and form a substantially rectangular closed cross section elongated in a vehicle width direction. The roof panel is supported by inner portions on upper surfaces of the upper members in the vehicle width direction. A cross member connecting the pair of right and left roof side rails to each other is supported by inner portions on lower surfaces of the lower members in the vehicle width direction. A sun shade apparatus is disposed at a position surrounded by the pair of right and left roof side rails and the cross member. An outer end portion of the roof panel in the vehicle width direction and an upper surface of the roof side rail are covered with a roof side garnish.

DESCRIPTION OF EMBODIMENTS

Hereinafter, an embodiment of the disclosure will be described based on FIG. 1 to FIG. 6. In this specification, a front-rear direction, a right-left direction (vehicle width direction), and an up-down direction are defined from the perspective of an occupant seated in a driver's seat.

Figure 1:
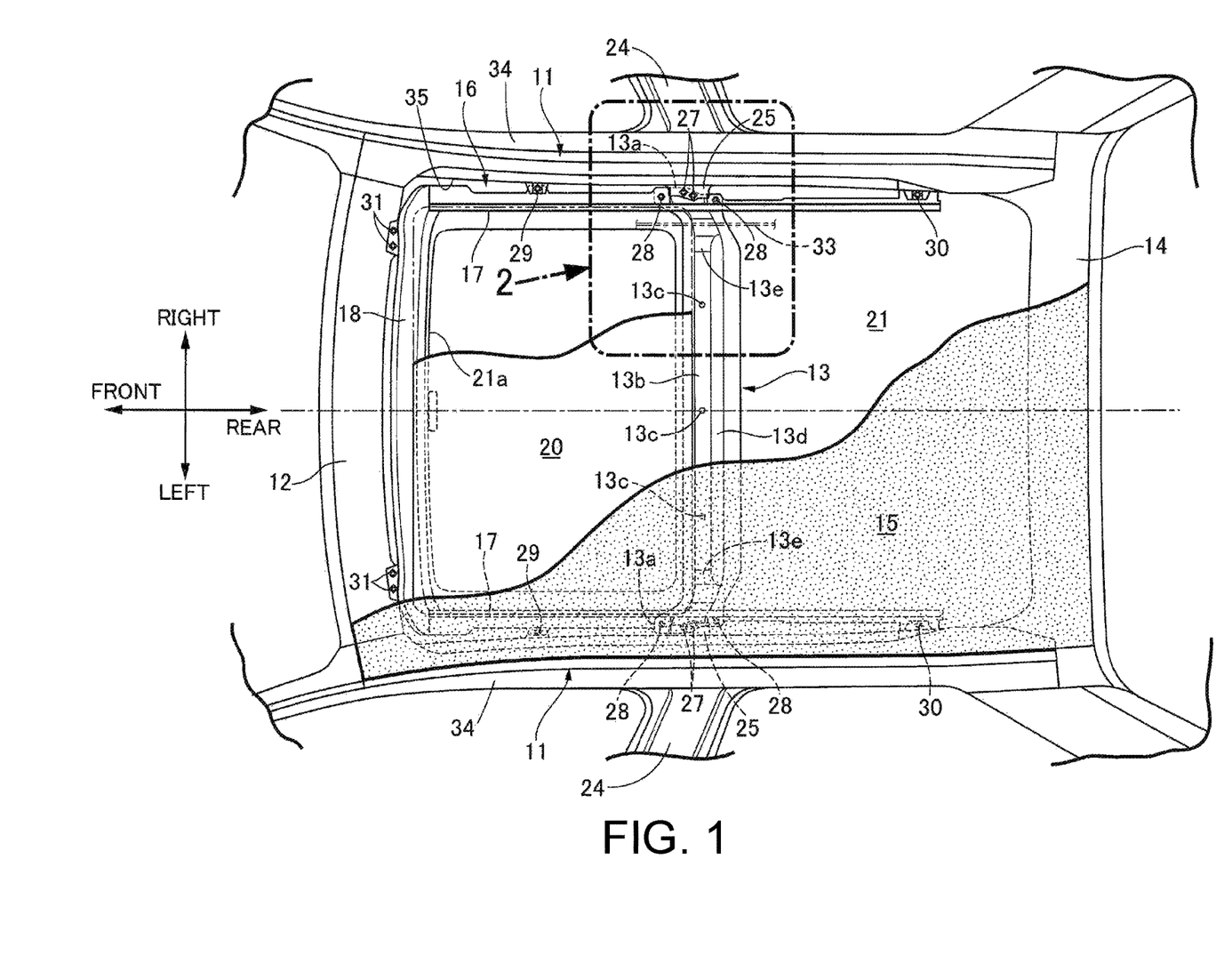
FIG. 1 is a plan view of a roof portion of an automobile.
Figure 2:
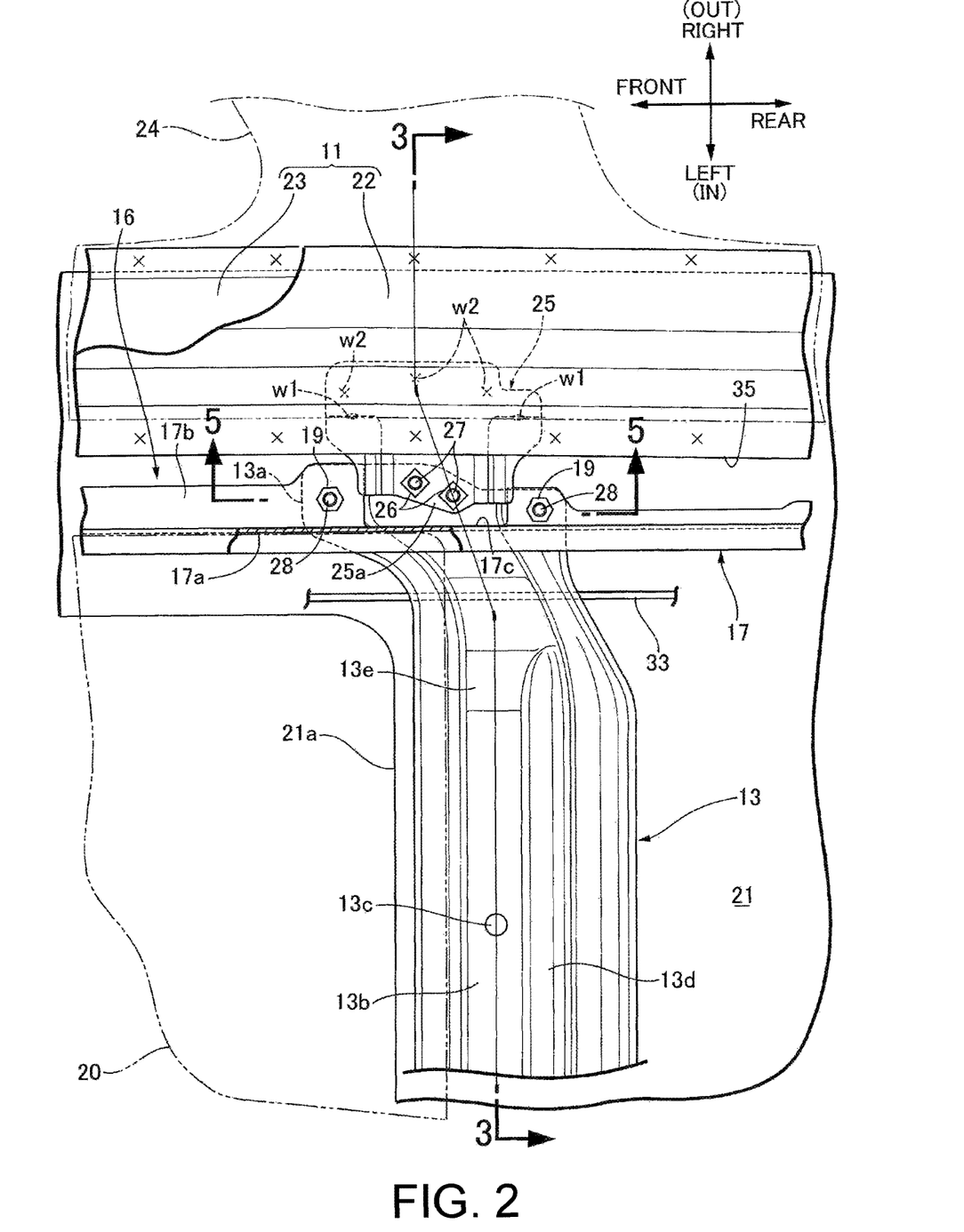
FIG. 2 is an enlarged view of a part 2 in FIG. 1.

As illustrated in FIG. 1, a frame of a roof portion of an automobile includes a pair of right and left roof side rails 11 extending in the front-rear direction; and a front roof arch 12, a cross member 13 (middle roof arch), and a rear roof arch 14 through which front portions, middle portions and rear portions of the right and left roof side rails 11 are connected to each other respectively in the vehicle width direction. An upper surface of a region surrounded by the right and left roof side rails 11, the front roof arch 12, and the rear roof arch 14 is covered with a black transparent roof panel 15. Outer end portions of the roof panel 15 in the vehicle width direction and upper surfaces of the roof side rails 11 are covered with belt-like roof side garnishes 34 (refer to FIG. 1 and FIG. 3).

A sun shade apparatus 16 disposed in a roof opening portion 35 surrounded by the right and left roof side rails 11 below the roof panel 15, the front roof arch 12, and the rear roof arch 14 includes a pair of right and left guide frames 17 which are disposed in the front-rear direction along inner sides of the right and left roof side rails 11 in the vehicle width direction, a front cross member 18 which connects front ends of the right and left guide frames 17 to each other in the vehicle width direction, the cross member 13 which connects intermediate portions of the right and left guide frames 17 in the front-rear direction to each other in the vehicle width direction, and a board-like shade member 20 which is supported by the right and left guide frames 17 to be able to slide forward and rearward.

Figure 3:
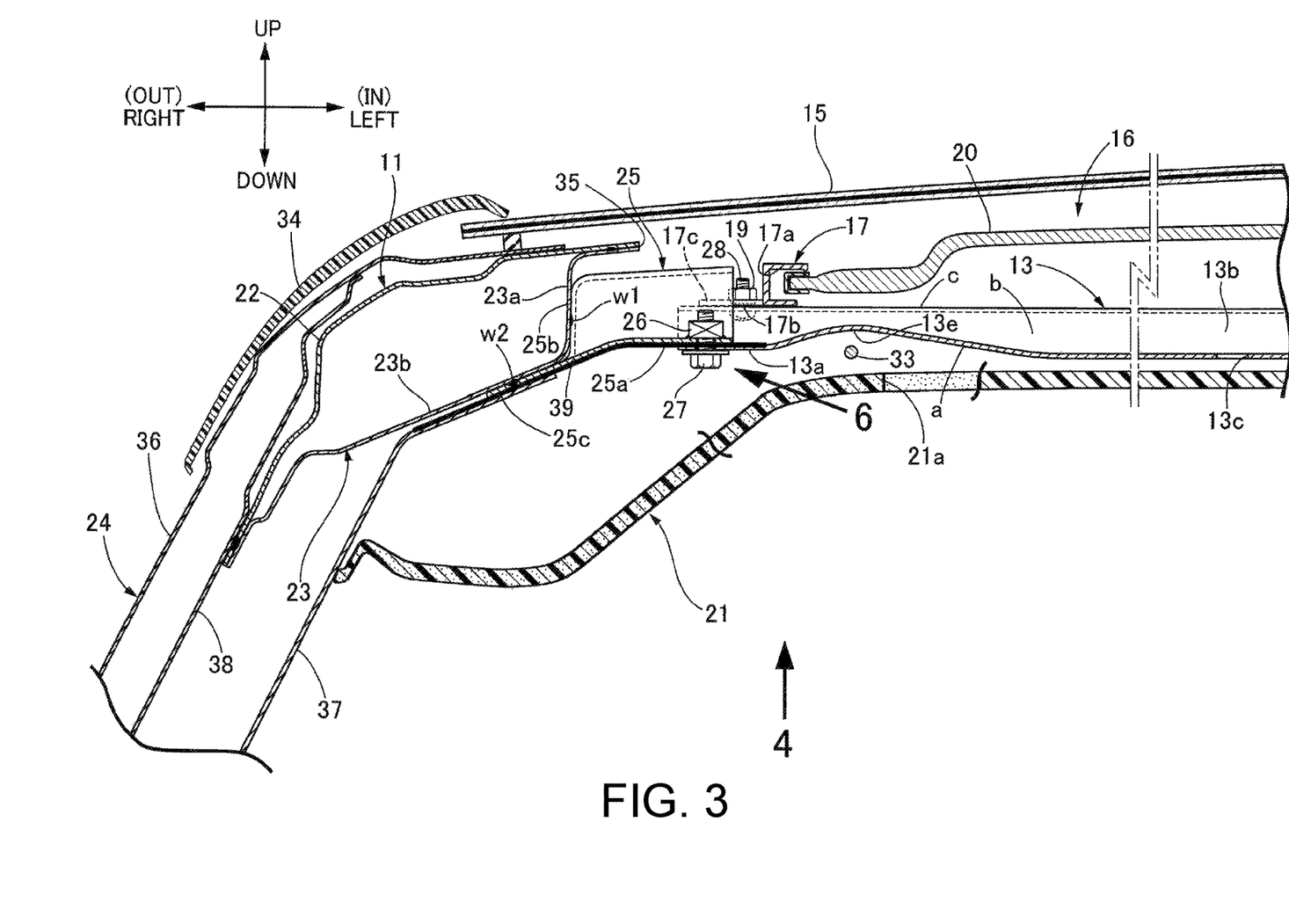
FIG. 3 is a cross-sectional view along line 3-3 in FIG. 2.
Figure 4:
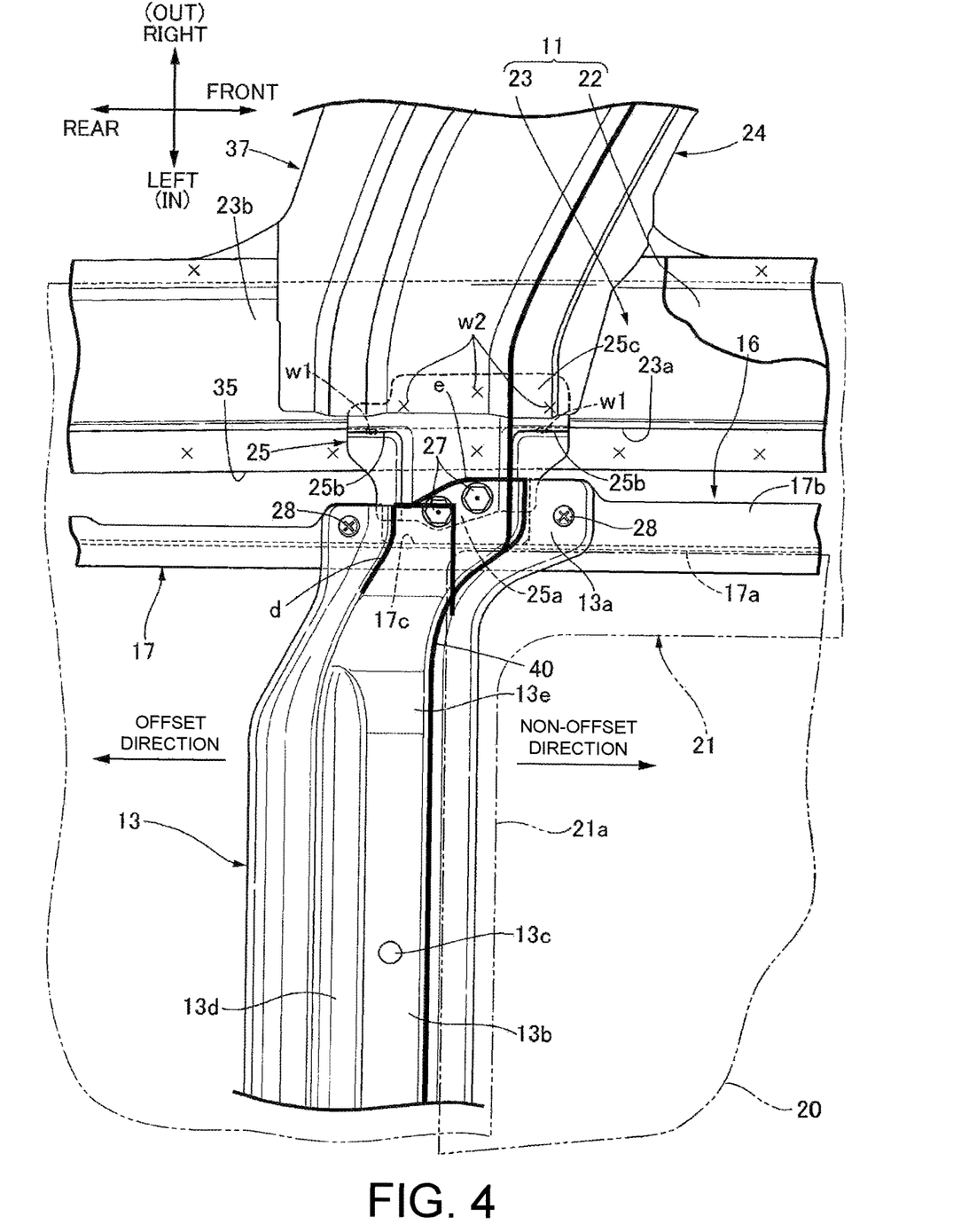
FIG. 4 is a view viewed in a direction of an arrow 4 in FIG. 3.

As it is clear with reference to FIG. 3, a roof lining 21 covering a lower part of the sun shade apparatus 16 includes a quadrangular opening portion 21a at a position surrounded by the right and left guide frames 17, the front cross member 18, and the cross member 13. When the shade member 20 is moved forward along the guide frames 17, the opening portion 21a of the roof lining 21 is closed, and when the shade member 20 is moved rearward, the opening portion 21a of the roof lining 21 is opened, so that the inside of a vehicle cabin can be lighted through the transparent roof panel 15. Since the roof panel 15 is a black transparent member, while an aesthetic appearance is enhanced by shielding the sun shade apparatus 16 from outside of a vehicle body, light transmitted through the roof panel 15 can be introduced into the vehicle cabin through the opened sun shade apparatus 16.

As illustrated in FIG. 3, each of the roof side rails 11 is constituted of an upper member 22 and a lower member 23 which are joined to each other and form a substantially rectangular closed cross section slender in the vehicle width direction. The outer end portions of the roof panel 15 in the vehicle width direction are supported by inner end portions on upper surfaces of the upper members 22 in the vehicle width direction, and brackets 25 for causing the cross member 13 to be supported by the roof side rails 11 are provided in inner end portions on lower surfaces of the lower members 23 in the vehicle width direction (refer to FIG. 6). A center pillar 24 is constituted of an outer member 36, an inner member 37, and a stiffener 38 which are joined to each other and form a closed cross section, and an upper end portion of the center pillar 24 is connected to the intermediate portion of the roof side rail 11 in the front-rear direction.

As illustrated in FIG. 2 to FIG. 6, the bracket 25 is a press-worked metal plate and includes a cross member connection portion 25a which has a hat-shaped cross section opening upward, front and rear attachment portions 25b which are provided to be connected to an outer side of the cross member connection portion 25a in the vehicle width direction and are welded (w1) to an inner wall 23a of the lower member 23 of the roof side rail 11 in the vehicle width direction, and an attachment portion 25c which is provided to be connected to the outer side of the cross member connection portion 25a in the vehicle width direction and is welded (w2) to a lower wall 23b of the lower member 23 of the roof side rail 11. Two nuts 26 are attached to the upper surface of the cross member connection portion 25a of the bracket 25 through welding.

The cross member 13 is constituted of a lower surface a, a pair of side surfaces b, and a pair of flanges c forming a hat-shaped cross section opening upward and includes attachment portions 13a at both ends in the vehicle width direction and a main body portion 13b sandwiched between the right and left attachment portions 13a. The main body portion 13b displaced rearward with respect to the attachment portions 13a includes a plurality of attachment holes 13c for fixing the roof lining 21 on a front edge side thereof, and a bead 13d is formed to protrude upward along a rear edge thereof. Curved portions 13e curved to project upward are formed at positions in both ends of the main body portion 13b in the vehicle width direction adjacent to the attachment portions 13a, and members such as harnesses 33 are disposed utilizing spaces between the curved portions 13e and the roof lining 21.

In the cross member 13 having such a shape, the attachment portion 13a thereof overlaps a lower surface of the cross member connection portion 25a of the bracket 25, and bolts 27 penetrating the attachment portion 13a of the cross member 13 and the cross member connection portion 25a of the bracket 25 upward from below are screwed to the nuts 26, so that the cross member 13 is fastened to the brackets 25. In this state, the attachment portion 25c of the bracket 25 and an upper end of the inner member 37 of the center pillar 24 are joined to the lower wall 23b of the lower member 23 of the roof side rail 11 in a three-layered manner. The lower surface a of the cross member 13, a lower surface of the bracket 25, and an inner surface of the inner member 37 of the center pillar 24 in the vehicle width direction constitute a connected surface 39 (refer to the bold solid line in FIG. 3), and a ridge of a cross member 13, a ridge of the bracket 25, and a ridge of the inner member 37 of the center pillar 24 form one connected ridge 40 (refer to the bold solid line in FIG. 4).

Figure 5:
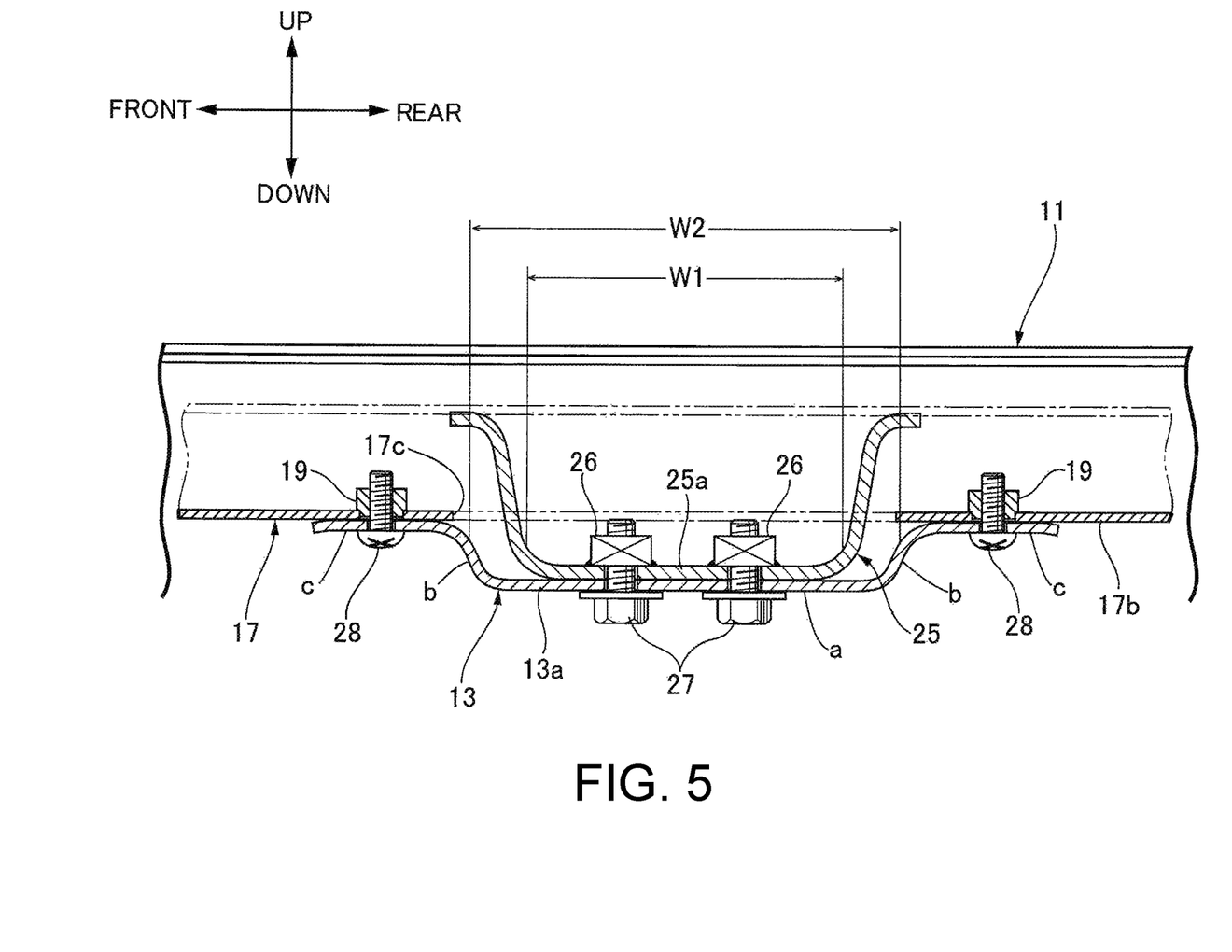
FIG. 5 is a cross-sectional view along line 5-5 in FIG. 2.
Figure 6:
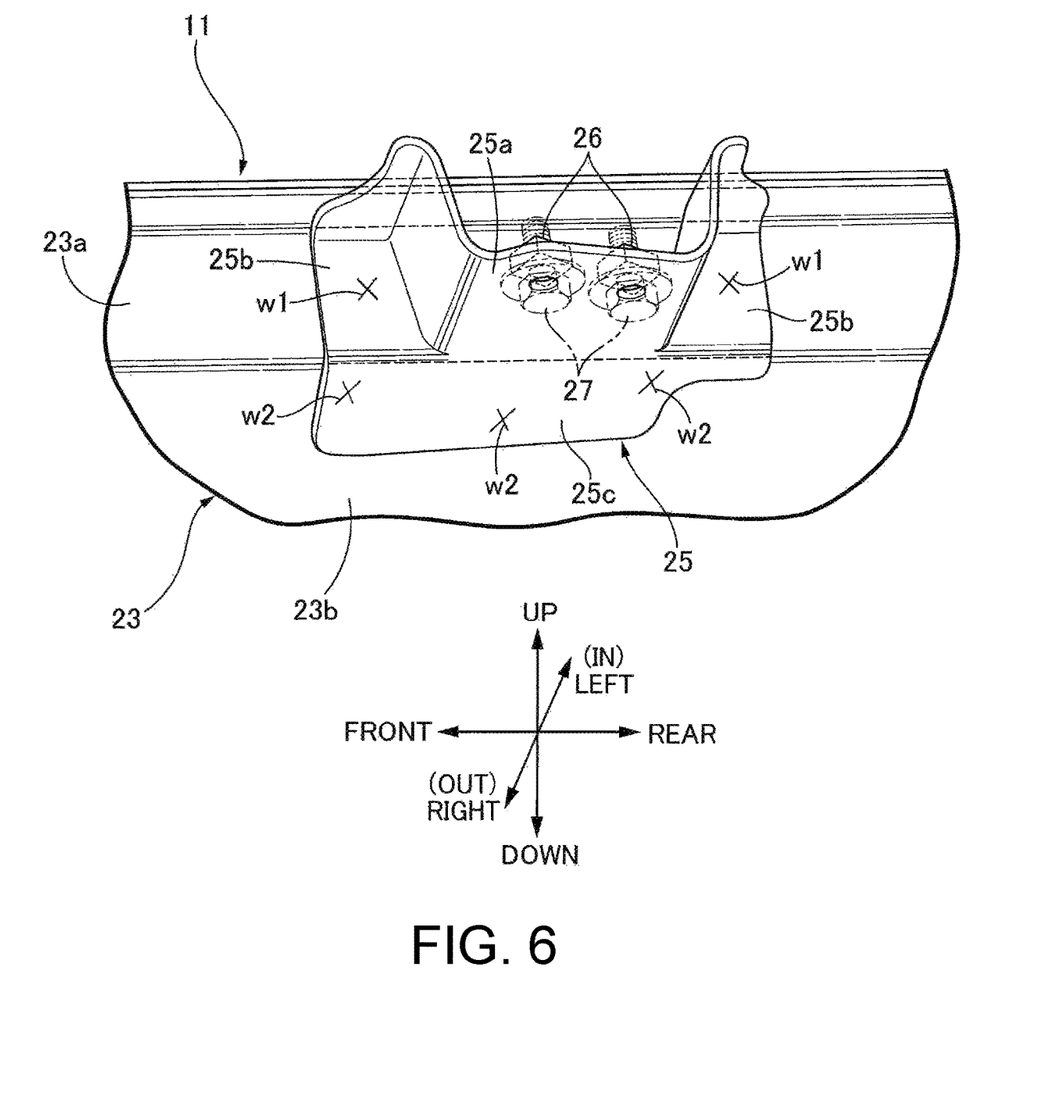
FIG. 6 is a view viewed in a direction of an arrow 6 in FIG. 3.

In a connection portion of the bracket 25 and the cross member 13, a width W2 of the cross member 13 in the front-rear direction positioned downward is set to be larger than a width W1 of the bracket 25 in the front-rear direction positioned upward (refer to FIG. 5). Since the attachment portion 13a of the cross member 13 is curved to be offset rearward, the lower surface of the attachment portion 13a thereof includes a first fixed portion d and a second fixed portion e which extends outward to a non-offset side and in the vehicle width direction from the first fixed portion d. The center of one of two bolts 27 fastening the cross member 13 to the bracket 25 is disposed in the first fixed portion d, and the center of the other is disposed in the second fixed portion e (refer to FIG. 4).

The guide frame 17 includes a guide groove 17a for guiding a side edge of the shade member 20 to be able to slide forward and rearward, and a flange portion 17b projecting outward in the vehicle width direction from the guide groove 17a in a belt shape, and a rectangular cut-out portion 17c opening outward in the vehicle width direction is formed in an edge portion of the flange portion 17b facing the bracket 25. The flange portion 17b of the guide frame 17 is fastened to the attachment portion 13a of the cross member 13 by screwing two bolts 28 penetrating the flange c of the attachment portion 13a of the cross member 13 and the flange portion 17b of the guide frame 17 upward from below into two nuts 19 press-fitted on the upper surface of the flange portion 17b in a state where the cut-out portion 17c thereof is fitted into the bracket 25 from the inside in the vehicle width direction. Therefore, the guide frame 17 is indirectly supported by the bracket 25 with the cross member 13 interposed therebetween.

As illustrated in FIG. 1, in the sun shade apparatus 16, in addition to the middle portion of each of the guide frames 17 in the foregoing direction being fixed to the cross member 13 using two bolts 28 as described above, a front end portion and a rear end portion are fixed to the roof side rails 11 using bolts 29 and 30, respectively. Moreover, both end portions of the front cross member 18 in the vehicle width direction are fixed to the front roof arch 12 using two bolts 31 for each.

Next, operations of the embodiment of the disclosure having the foregoing constitution will be described.

Since the right and left roof side rails 11 extending in the front-rear direction are connected to both end portions of the cross member 13 in the vehicle width direction extending in the vehicle width direction with the brackets 25 interposed therebetween, side collision resisting performance can be ensured by transferring a collision load of a side collision from the center pillar 24 and the roof side rails 11 to the cross member 13 via the bracket 25.

Particularly, since each of the pair of right and left roof side rails 11 is constituted of the upper member 22 and the lower member 23 which are joined to each other and form a substantially rectangular closed cross section elongated in the vehicle width direction, the dimension in the up-down direction can be reduced while a closed cross-sectional area required for the roof side rail 11 is ensured to maintain a strength and a rigidity thereof. Accordingly, the height of the vehicle cabin can be ensured by compactly disposing the sun shade apparatus 16 under a lower surface of the roof panel 15 while curbing inward deformation in the vehicle width direction regarding the roof side rails 11 connected to an upper end of the center pillar 24 in cooperation with the cross member 13 when a collision load of a side collision is input to the center pillar 24. Moreover, due to the roof side garnishes 34 covering the outer end portions of the roof panel 15 in the vehicle width direction and the upper surfaces of the roof side rails 11, the rigidity and the strength of the roof side rails 11 can be further enhanced.

In addition, the upper end portion of the center pillar 24 and the intermediate portion of the roof side rail 11 in the front-rear direction are connected to the cross member 13 with the bracket 25 interposed therebetween. The roof opening portion 35 for accommodation is formed by the front roof arch 12 connecting the front ends of the pair of right and left roof side rails 11 to each other, the pair of right and left roof side rails 11, and the cross member 13. Then, the sun shade apparatus 16 is disposed in the roof opening portion 35. However, the cross member 13 is offset rearward with respect to the upper end portion of the center pillar 24, and the ridges 40 (refer to FIG. 4) of the center pillar 24, the bracket 25, and the cross member 13 are connected to each other. Accordingly, while the vehicle cabin is efficiently lighted by enlarging the area of the roof opening portion 35, the connected ridges 40 of the center pillar 24, the bracket 25, and the cross member 13 can compensate for deterioration in side collision resisting performance caused by the offset cross member 13, and the center pillar 24 can be prevented from falling to the vehicle cabin side due to a collision load.

In addition, since the lower surface a of the cross member 13 formed to have a hat-shaped cross section, the lower surface of the bracket 25, and the inner surface of the center pillar 24 in the vehicle width direction constitute the connected surface 39 (refer to FIG. 3), when a collision load of a side collision is input to the center pillar 24, the collision load can be reliably transferred from the center pillar 24 to the cross member 13 via the connected surface 39. Moreover, since the guide frames 17 of the sun shade apparatus 16 are supported by the flanges c of the cross member 13 formed to have a hat-shaped cross section opening upward, even if the distance between the roof panel 15 and a lower surface c of the cross member 13 in the up-down direction is set to be short in order to ensure the height of the vehicle cabin, spaces for disposing the guide frames 17 of the sun shade apparatus 16 can be ensured.

In addition, since the bracket 25 and the cross member 13 have a hat-shaped cross section opening upward, not only the strengths of the bracket 25 and the cross member 13 are enhanced and the side collision resisting performance is improved, but also the bracket 25 is fixed to the inner wall 23a and the lower wall 23b of the roof side rail 11 in the vehicle width direction. Accordingly, the bracket 25 is firmly joined to the roof side rail 11, and a collision load of a side collision can be efficiently transferred from the roof side rail 11 to the cross member 13.

In addition, since the cross member 13 includes the curved portions 13e curved to project upward in the vicinity of the brackets 25, not only can members such as the harnesses 33 be disposed utilizing spaces between the curved portions 13e and the roof lining 21, but also collision energy can be absorbed by causing the cross member 13 to be deformed to project upward in the curved portion 13e when a collision load of a side collision is input. Moreover, since the cross member 13 includes the attachment holes 13c for attaching the roof lining 21 on the front side and includes the bead 13d extending in the vehicle width direction on the rear side, the side collision resisting performance can be enhanced by causing the bead 13d to compensate for deterioration in strength of the cross member 13 due to the attachment holes 13c provided to support the roof lining 21 and ensuring the strength of the cross member 13.

In addition, since the main body portion 13b is displaced rearward with respect to the right and left attachment portions 13a of the cross member 13, the dimension of the opening portion 21a of the roof lining 21 in the front-rear direction formed in front of the cross member 13 can be enlarged. At this time, since the width W2 of the cross member 13 in the front-rear direction is larger than the width W1 of the bracket 25 in the front-rear direction, the degree of freedom for the position of the cross member 13 in the front-rear direction when the cross member 13 is fixed to the bracket 25 increases, and therefore the degree of freedom for the dimension of the opening portion 21a of the roof lining 21 in the front-rear direction increases.

Moreover, since the cross member connection portion 25a of the bracket 25 includes the first fixed portion d and the second fixed portion e, and the first fixed portion d and the second fixed portion e are fastened to the cross member 13 using the bolts 27 respectively, even if the cross member 13 is offset with respect to the center pillar 24, a collision load of a side collision input to the center pillar 24 can be reliably transferred to the cross member 13 and it can be supported.

In addition, since the bracket 25 is sandwiched between the lower member 23 of the roof side rail 11 and the inner member 37 of the center pillar 24, the center pillar 24 can be firmly connected to the roof side rail 11 and the cross member 13, and the center pillar 24 can be prevented from falling to the vehicle cabin side when a collision load of a side collision is input to the center pillar 24.

Hereinabove, an embodiment of the disclosure has been described. However, the disclosure can be subjected to various design changes within a range not departing from the gist thereof.

For example, in the embodiment, the cross member 13 is fastened to the bracket 25 using two bolts 27, but the number of bolts 27 may be arbitrarily set.

According to the embodiment, in addition to the constitution of the claim 1, in the vehicle body structure of an automobile, an upper end portion of a center pillar and an intermediate portion of the roof side rail in the front-rear direction are connected to the cross member with a bracket interposed therebetween. A roof opening portion for accommodating the sun shade apparatus is formed by a front roof arch connecting front ends of the pair of right and left roof side rails to each other, the pair of right and left roof side rails, and the cross member. The cross member is offset rearward with respect to the upper end portion of the center pillar. Ridges of the center pillar, the bracket, and the cross member are connected to each other.

According to the embodiment, in addition to the constitution of the claim 2, in the vehicle body structure of an automobile, the sun shade apparatus includes guide frames and a plate-like shade member which is slidably supported by the guide frames. The cross member has a lower surface, a pair of side surfaces, and a pair of flanges forming a hat-shaped cross section opening upward. The lower surface of the cross member, a lower surface of the bracket, and an inner surface of the center pillar in the vehicle width direction constitute a connected surface. The guide frame is supported by the flange of the cross member.

According to the embodiment, in addition to the constitution of the claim 3, in the vehicle body structure of an automobile, in a connection portion of the bracket and the cross member, a width of the cross member in the front-rear direction is larger than a width of the bracket in the front-rear direction.

According to the embodiment, in addition to the constitution of the claim 4, in the vehicle body structure of an automobile, the bracket and the cross member have a hat-shaped cross section opening upward.

According to the embodiment, in addition to the constitution of the claim 1, in the vehicle body structure of an automobile, the cross member includes an attachment hole for a roof lining on a front side and includes a bead extending in the vehicle width direction on a rear side.

According to the embodiment, in addition to the constitution of the claim 1, in the vehicle body structure of an automobile, the cross member includes a curved portion curved to project upward at a position on an outer side in the vehicle width direction.

According to the embodiment, in addition to the constitution of the claim 1, in the vehicle body structure of an automobile, the bracket is fixed to an inner wall and a lower wall of the roof side rail in the vehicle width direction.

According to the embodiment, in addition to the constitution of the claim 1, in the vehicle body structure of an automobile, the roof panel is a black transparent member.

According to the embodiment, in addition to the constitution of the claim 2, in the vehicle body structure of an automobile, a cross member connection portion in which the cross member is connected to the bracket includes a first fixed portion and a second fixed portion which extends outward to a non-offset side and in the vehicle width direction from the first fixed portion, such that the cross member is fixed to the bracket at least at two places such as the first fixed portion and the second fixed portion.

According to the embodiment, in addition to the constitution of the claim 2, in the vehicle body structure of an automobile, the bracket is sandwiched between the lower member of the roof side rail and an inner member of the center pillar.

According to the constitution of the claim 1, the pair of right and left roof side rails extending in the front-rear direction are connected to each other through the roof panel. The roof side rail is constituted of the upper member and the lower member which are joined to each other and form a substantially rectangular closed cross section elongated in the vehicle width direction. The roof panel is supported by the inner portions on the upper surfaces of the upper members in the vehicle width direction. The cross member connecting the pair of right and left roof side rails to each other is supported by the inner portions on the lower surfaces of the lower members in the vehicle width direction. The sun shade apparatus is disposed at a position surrounded by the pair of right and left roof side rails and the cross member. The outer end portion of the roof panel in the vehicle width direction and the upper surface of the roof side rail are covered with the roof side garnish. Thus, the dimension in an up-down direction is reduced while a closed cross-sectional area required for the cross member is ensured to maintain a strength and a rigidity thereof. Side collision resisting performance is enhanced by restricting bending of the roof side rails in cooperation with the cross member when a collision load of a side collision is input. The height of a vehicle cabin can be ensured by compactly disposing the sun shade apparatus under a lower surface of the roof panel. Moreover, due to the roof side garnishes covering the outer end portions of the roof panel in the vehicle width direction and the upper surfaces of the roof side rails, the rigidity and the strength of the roof side rails can be further enhanced.

According to the constitution of the claim 2, the upper end portion of the center pillar and the intermediate portion of the roof side rail in the front-rear direction are connected to the cross member with the bracket interposed therebetween. The roof opening portion for accommodating the sun shade apparatus is formed by the front roof arch connecting the front ends of the pair of right and left roof side rails to each other, the pair of right and left roof side rails, and the cross member. The cross member is offset rearward with respect to the upper end portion of the center pillar. The ridges of the center pillar, the bracket, and the cross member are connected to each other. Thus, while the vehicle cabin is efficiently lighted by enlarging the area of the roof opening portion, the connected ridges of the center pillar, the bracket, and the cross member can compensate for deterioration in side collision resisting performance caused by the offset cross member, and the center pillar can be prevented from falling to the vehicle cabin side due to a collision load.

According to the constitution of the claim 3, the sun shade apparatus includes the guide frames and the plate-like shade member which is slidably supported by the guide frames. The cross member has the lower surface, the pair of side surfaces, and the pair of flanges forming a hat-shaped cross section opening upward. The lower surface of the cross member, the lower surface of the bracket, and the inner surface of the center pillar in the vehicle width direction constitute the connected surface. The guide frame is supported by the flange of the cross member. Thus, when a collision load of a side collision is input to the center pillar, the collision load is reliably transferred from the center pillar to the cross member via the connected surface, and the guide frames of the sun shade apparatus are supported by the flanges of the cross member formed to have a hat-shaped cross section opening upward. Accordingly, even if the distance between the roof panel and the lower surface of the cross member in the up-down direction is set to be short in order to ensure the height of the vehicle cabin, spaces for disposing the guide frames of the sun shade apparatus can be ensured.

According to the constitution of the claim 4, in the connection portion of the bracket and the cross member, the width of the cross member in the front-rear direction is larger than the width of the bracket in the front-rear direction. Thus, the degree of freedom for the position of the cross member in the front-rear direction when the cross member is fixed to the bracket increases, and therefore the degree of freedom for the dimension of the sun shade apparatus in the front-rear direction increases.

According to the constitution of the claim 5, the bracket and the cross member have a hat-shaped cross section opening upward. Thus, the strengths of the bracket and the cross member are enhanced and the side collision resisting performance is improved.

According to the constitution of the claim 6, the cross member includes the attachment hole for the roof lining on the front side and includes the bead extending in the vehicle width direction on the rear side. Thus, not only can the roof lining be supported utilizing the cross member, but also the side collision resisting performance can be enhanced by reinforcing the cross member with the bead.

According to the constitution of the claim 7, the cross member includes the curved portion curved to project upward at a position on the outer side in the vehicle width direction. Thus, not only can collision energy be absorbed by causing the cross member to be deformed to project upward in the curved portion when a collision load of a side collision is input, but also an article such as a harness can be disposed utilizing a space formed below the curved portion.

According to the constitution of the claim 8, the bracket is fixed to the inner wall and the lower wall of the roof side rail in the vehicle width direction. Thus, the brackets can be firmly joined to the roof side rails, and a collision load of a side collision can be efficiently transferred from the roof side rail to the cross member.

According to the constitution of the claim 9, the roof panel is a black transparent member. Thus, an aesthetic appearance can be enhanced by shielding the sun shade apparatus from outside of a vehicle body, and the inside of the vehicle cabin can be lighted by introducing light transmitted through the roof panel into the vehicle cabin through the opened sun shade apparatus.

According to the constitution of the claim 10, the cross member connection portion in which the cross member is connected to the bracket includes the first fixed portion and the second fixed portion which extends outward to the non-offset side and in the vehicle width direction from the first fixed portion, such that the cross member is fixed to the bracket at least at two places such as the first fixed portion and the second fixed portion. Thus, even if the cross member is offset with respect to the center pillar, a collision load of a side collision input to the center pillar can be reliably transferred to the cross member and it can be supported.

According to the constitution of the claim 11, the bracket is sandwiched between the lower member of the roof side rail and the inner member of the center pillar. Thus, the center pillar can be firmly connected to the roof side rail and the cross member, and the center pillar can be prevented from falling to the vehicle cabin side when a collision load of a side collision is input to the center pillar.

What is claimed is:

1. A vehicle body structure of an automobile in which a pair of right and left roof side rails (11) extending in a front-rear direction are connected to each other through a roof panel (15),
    wherein the pair of right and left roof side rails (11) is constituted of an upper member (22) and a lower member (23) which are joined to each other and form a substantially rectangular closed cross section elongated in a vehicle width direction,
    wherein the roof panel (15) is supported by inner portions on upper surfaces of the upper members (22) in the vehicle width direction,
    wherein a cross member (13) connecting the pair of right and left roof side rails (11) to each other is supported by inner portions on lower surfaces of the lower members (23) in the vehicle width direction,
    wherein a sun shade apparatus (16) is disposed at a position surrounded by the pair of right and left roof side rails (11) and the cross member (13), and
    wherein an outer end portion of the roof panel (15) in the vehicle width direction and an upper surface of the pair of right and left roof side rails (11) are covered with a roof side garnish (34),
    wherein an upper end portion of a center pillar (24) and an intermediate portion of the pair of right and left roof side rails (11) in the front-rear direction are connected to the cross member (13) with a bracket (25) interposed therebetween,
    wherein a roof opening portion (35) for accommodating the sun shade apparatus (16) is formed by a front roof arch (12) connecting front ends of the pair of right and left roof side rails (11) to each other, the pair of right and left roof side rails (11), and the cross member (13),
    wherein the cross member (13) is offset rearward with respect to the upper end portion of the center pillar (24),
    wherein ridges (40) of the center pillar (24), the bracket (25), and the cross member (13) are connected to each other, and
    wherein the bracket (25) is in contact with an inner wall (23a) and a lower wall (23b) of the pair of right and left roof side rails (11) in the vehicle width direction.

2. The vehicle body structure of an automobile according to claim 1,
    wherein the sun shade apparatus (16) includes guide frames (17) and a plate-like shade member (20) which is slidably supported by the guide frames (17),
    wherein the cross member (13) has a lower surface (a), a pair of side surfaces (b), and a pair of flanges (c), and is formed as a hat-shaped cross section opening upward,
    wherein the lower surface (a) of the cross member (13), a lower surface of the bracket (25), and an inner surface of the center pillar (24) in the vehicle width direction constitute a connected surface (39), and
    wherein the guide frame (17) is supported by the flange (c) of the cross member (13).

3. The vehicle body structure of an automobile according to claim 2,
    wherein in a connection portion of the bracket (25) and the cross member (13), a width (W2) of the cross member (13) in the front-rear direction is larger than a width (W1) of the bracket (25) in the front-rear direction.

4. The vehicle body structure of an automobile according to claim 3,
    wherein the bracket (25) and the cross member (13) are formed as a hat-shaped cross section opening upward.

5. The vehicle body structure of an automobile according to claim 1,
    wherein the cross member (13) includes an attachment hole (13c) for a roof lining (21) on a front side and includes a bead (13d) extending in the vehicle width direction on a rear side.

6. The vehicle body structure of an automobile according to claim 1,
    wherein the cross member (13) includes a curved portion (13e) curved to project upward at a position on an outer side in the vehicle width direction.

7. The vehicle body structure of an automobile according to claim 1,
    wherein the roof panel (15) is a black transparent member.

8. The vehicle body structure of an automobile according to claim 1,
    wherein a cross member connection portion (25a) in which the cross member (13) is connected to the bracket (25) includes a first fixed portion (d) and a second fixed portion (e) which extends outward to a front side in the front-rear direction and in the vehicle width direction from the first fixed portion (d), and the cross member (13) is fixed to the bracket (25) at least at the first fixed portion (d) and the second fixed portion (e).

9. The vehicle body structure of an automobile according to claim 1,
    wherein the bracket (25) is sandwiched between the lower member (23) of the pair of right and left roof side rails (11) and an inner member (37) of the center pillar (24).

10. A vehicle body structure of an automobile in which a pair of right and left roof side rails (11) extending in a front-rear direction are connected to each other through a roof panel (15),
   wherein the pair of right and left roof side rails (11) is constituted of an upper member (22) and a lower member (23) which are joined to each other and form a substantially rectangular closed cross section elongated in a vehicle width direction,
   wherein the roof panel (15) is supported by inner portions on upper surfaces of the upper members (22) in the vehicle width direction,
   wherein a cross member (13) connecting the pair of right and left roof side rails (11) to each other is supported by inner portions on lower surfaces of the lower members (23) in the vehicle width direction,
   wherein a sun shade apparatus (16) is disposed at a position surrounded by the pair of right and left roof side rails (11) and the cross member (13), and
   wherein an outer end portion of the roof panel (15) in the vehicle width direction and an upper surface of the pair of right and left roof side rails (11) are covered with a roof side garnish (34),
   wherein an upper end portion of a center pillar (24) and an intermediate portion of the pair of right and left roof side rails (11) in the front-rear direction are connected to the cross member (13) with a bracket (25) interposed therebetween,
   wherein a roof opening portion (35) for accommodating the sun shade apparatus (16) is formed by a front roof arch (12) connecting front ends of the pair of right and left roof side rails (11) to each other, the pair of right and left roof side rails (11), and the cross member (13),
   wherein the cross member (13) is offset rearward with respect to the upper end portion of the center pillar (24),
   wherein ridges (40) of the center pillar (24), the bracket (25), and the cross member (13) are connected to each other, and
   wherein the bracket (25) is sandwiched between the lower member (23) of the pair of right and left roof side rails (11) and an inner member (37) of the center pillar (24) in a three-layered manner.

11. The vehicle body structure of an automobile according to claim 10,
   wherein the sun shade apparatus (16) includes guide frames (17) and a plate-like shade member (20) which is slidably supported by the guide frames (17),
   wherein the cross member (13) has a lower surface (a), a pair of side surfaces (b), and a pair of flanges (c), and is formed as a hat-shaped cross section opening upward,
   wherein the lower surface (a) of the cross member (13), a lower surface of the bracket (25), and an inner surface of the center pillar (24) in the vehicle width direction constitute a connected surface (39), and
   wherein the guide frame (17) is supported by the flange (c) of the cross member (13).

12. The vehicle body structure of an automobile according to claim 11,
   wherein in a connection portion of the bracket (25) and the cross member (13), a width (W2) of the cross member (13) in the front-rear direction is larger than a width (W1) of the bracket (25) in the front-rear direction.

13. The vehicle body structure of an automobile according to claim 12,
   wherein the bracket (25) and the cross member (13) are formed as a hat-shaped cross section opening upward.

14. The vehicle body structure of an automobile according to claim 10,
   wherein the cross member (13) includes an attachment hole (13c) for a roof lining (21) on a front side and includes a bead (13d) extending in the vehicle width direction on a rear side.

15. The vehicle body structure of an automobile according to claim 10,
   wherein the cross member (13) includes a curved portion (13e) curved to project upward at a position on an outer side in the vehicle width direction.

16. The vehicle body structure of an automobile according to claim 10,
   wherein the roof panel (15) is a black transparent member.

17. The vehicle body structure of an automobile according to claim 10, wherein a cross member connection portion (25a) in which the cross member (13) is connected to the bracket (25) includes a first fixed portion (d) and a second fixed portion (e) which extends outward to a front side in the front-rear direction and in the vehicle width direction from the first fixed portion (d), and the cross member (13) is fixed to the bracket (25) at least at the first fixed portion (d) and the second fixed portion (e).

* * * * *